United States Patent [19]

Kitamura

[11] Patent Number: 4,797,205
[45] Date of Patent: Jan. 10, 1989

[54] APPARATUS FOR SEPARATING OILY CUTTING LIQUID

[75] Inventor: Koichiro Kitamura, Takaoka, Japan
[73] Assignee: Kitamura Machinery Co., Ltd., Takaoka, Japan
[21] Appl. No.: 32,310
[22] Filed: Mar. 31, 1987

[30] Foreign Application Priority Data

Apr. 3, 1986 [JP] Japan .............................. 61-48964[U]

[51] Int. Cl.⁴ .......................... B03D 3/00; B01D 21/06
[52] U.S. Cl. ...................................... 210/86; 210/171; 210/172; 210/242.3
[58] Field of Search ...................... 210/171, 242.3, 776, 210/923, 805, 540, 172, 86; 184/6.24

[56] References Cited

U.S. PATENT DOCUMENTS

| | | | |
|---|---|---|---|
| Re. 32,298 | 12/1986 | Baer | 210/223 |
| 3,338,414 | 8/1967 | Lefke et al. | 210/923 |
| 3,358,838 | 12/1967 | Kosar et al. | 210/923 |
| 4,139,464 | 2/1979 | Coward | 210/805 |
| 4,220,533 | 9/1980 | Baer | 210/223 |
| 4,360,429 | 11/1982 | Morris | 210/923 |
| 4,368,122 | 1/1983 | Ravagnan | 210/242.3 |

FOREIGN PATENT DOCUMENTS 2426024 3/1975 Fed. Rep. of Germany .
3323777 1/1985 Fed. Rep. of Germany .
449584 4/1968 Switzerland .
1604844 12/1981 United Kingdom .

*Primary Examiner*—Benoit Castel
*Attorney, Agent, or Firm*—Ronald P. Kananen

[57] ABSTRACT

An apparatus for separating an oily cutting liquid from a water-soluble cutting liquid, includes a main tank (10) for containing combined liquids (11) including in combination the oily cutting liquid and the water-soluble cutting liquid which constitute two liquid layers, rotation means (22) always immersed at its lower position in the combined cutting liquids (11) for taking out the oily cutting liquid of the combined cutting liquids (11) in such a way that the oily cutting liquid is attached onto the rotation means (22) when the rotation means (22) rotates in the combined cutting liquids (22), and means (23, 24) for removing the oily cutting liquid from the rotation means (22).

7 Claims, 6 Drawing Sheets

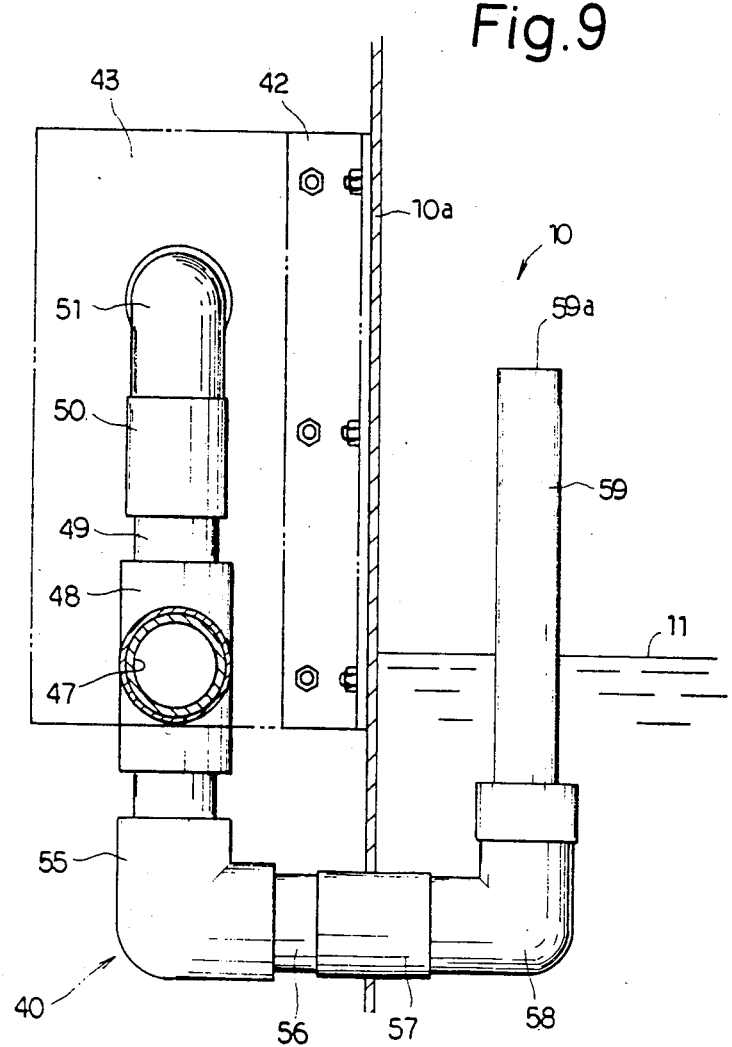

APPARATUS FOR SEPARATING OILY CUTTING LIQUID

BACKGROUND OF THE INVENTION

This invention relates to an apparatus for separating an oily cutting liquid from combined cutting liquids including both a water-soluble cutting liquid and the oily cutting liquid.

In a conventional machine tool, the cutting liquids are used for a tool or tools when a workpiece is machined. Either the water-soluble cutting liquid or the oily cutting liqiid is used in view of workpiece materials and types of tools to be used.

After the water-soluble cutting liquid and the oily cutting liquid are used at the machine tool, both of them are contained in a single tank. In this case, therefore, those different cutting liquids are combined in the tank.

If the used water-soluble cutting liquid is desired to be again used, the used water-soluble cutting liquid must be separated from the used oily cutting liquid. The used oily cutting liquid is normally thrown away.

The operation of separating the used water-soluble cutting liquid from the used oily cutting liquid is very important in order to increase the purity of the water-soluble cutting liquid to be recycled as well as in order to prevent the water-soluble cutting liquid from being decomposed.

It is well-known that the oily cutting liquid floats on the water-soluble cutting liquid due to a difference between their specific gravities so as to constitute two liquid layers. By taking this into consideration, a drain port is formed in a bottom portion of the tank. An operator is used to open regularly the drain port so that the water-soluble cutting liquid can be drained through the drain port to a predetermined level. As a result, the water-soluble cutting liquid is separated from the oily cutting liquid.

In such a conventional manner, an operator must pay attention to a liquid level in the tank. In addition, it is very difficult to separate precisely the water-soluble cutting liquid from the oily cutting liquid in the tank. Further, it is not unusual that the oily cutting liquid to be disposed remains in the tank. In such a case, it is extremely difficult to take out the oily cutting liquid from the tank.

SUMMARY OF THE INVENTION

The object of this invention is to provide a separating apparatus in which an oily cutting liquid can be automatically separated from a water-soluble cutting liquid so that the water-soluble cutting liquid can be reused.

According to this invention, a separating apparatus is used to separate an oily cutting liquid from combined cutting liquids containing both a water-soluble cutting liquid and the oily cutting liquid. The separating apparatus includes a rotation means for taking out the oily cutting liquid in the combined cutting liquids in such a way that the oily cutting liquid is attached onto the rotation means when the rotation means rotates in the oily cutting liquid, and a removing means for removing the oily cutting liquid from the rotation means.

In a preferred mode of this invention, the rotation means is formed in a disk shape, a ball shape or a belt shape. It is preferable that the rotation means includes a wiper having a sharp edge for contacting the rotation means. For example, the rotation means is set between a pair of wipers in such a manner that each edge of the wipers contacts the rotation means.

BRIEF DESCRIPTION OF THE DRAWINGS

FIG. 9 is a side view showing a removing means and its related members used in the separating apparatus of FIG. 1.

BRIEF DESCRIPTION OF THE PREFERRED EMBODIMENT

Figure 1:
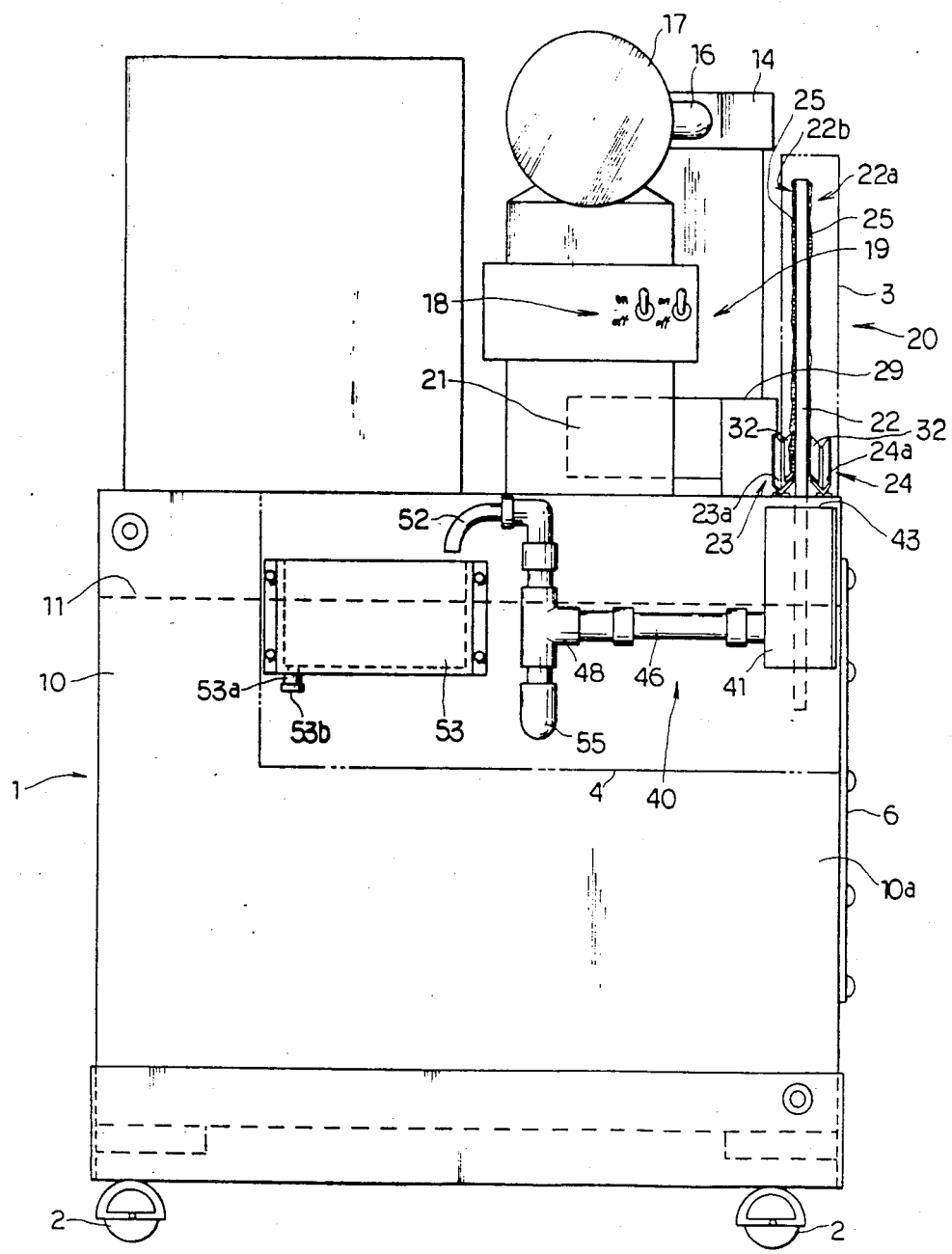
FIG. 1 is a front view showing a separating apparatus according to a preferred embodiment of this invention.

A separating apparatus 1 includes a main tank 10 in which combined cutting liquids 11 are contained. The combined cutting liquids 11 include both the water-soluble cutting liquid and the oily cutting liquid which have been used at a machine tool (not shown). The water-soluble cutting liquid is positioned in a lower portion of the main tank 10. The oily cutting liquid floats on the water-soluble cutting liquid and is positioned in an upper portion of the main tank 10. The water-soluble cutting liquid and the oily cutting liquid constitute two layers due to their specific gravity.

A taking-out means 20 is used to take out mainly the oily cutting liquid from the combined cutting liquids 11 contained in the tank. The taking-out means 20 includes a motor 21 as a driving source, a rotation member 22 to be driven by the motor 21 and a pair of removing members 23, 24. The rotation member 22 is designed so as to be partly immersed in the oily cutting liquid layer. When the rotation member 22 rotates, it takes out upwardly the oily cutting liquid from the tank 10. The removing members 23, 24 are used so as to remove the oily cutting liquid 25 attached to the rotation member 22. The oily cutting liquid 25 attached to the rotation member 22 is apt to be mixed with some minor water-soluble cutting liquid.

A separator 40 is provided in order to separate such minor water-soluble cutting liquid from the oily cutting liquid attached to the rotation member 22 whereby only the water-soluble cutting liquid without any oily cutting liquid can be returned to the main tank 10.

The rotation member 22 is preferably made of an acrylic resin so that the oily cutting liquid can be effectively attached or adhered to the rotation member.

DETAILED DESCRIPTION OF THE PREFERRED EMBODIMENT

Figure 2:
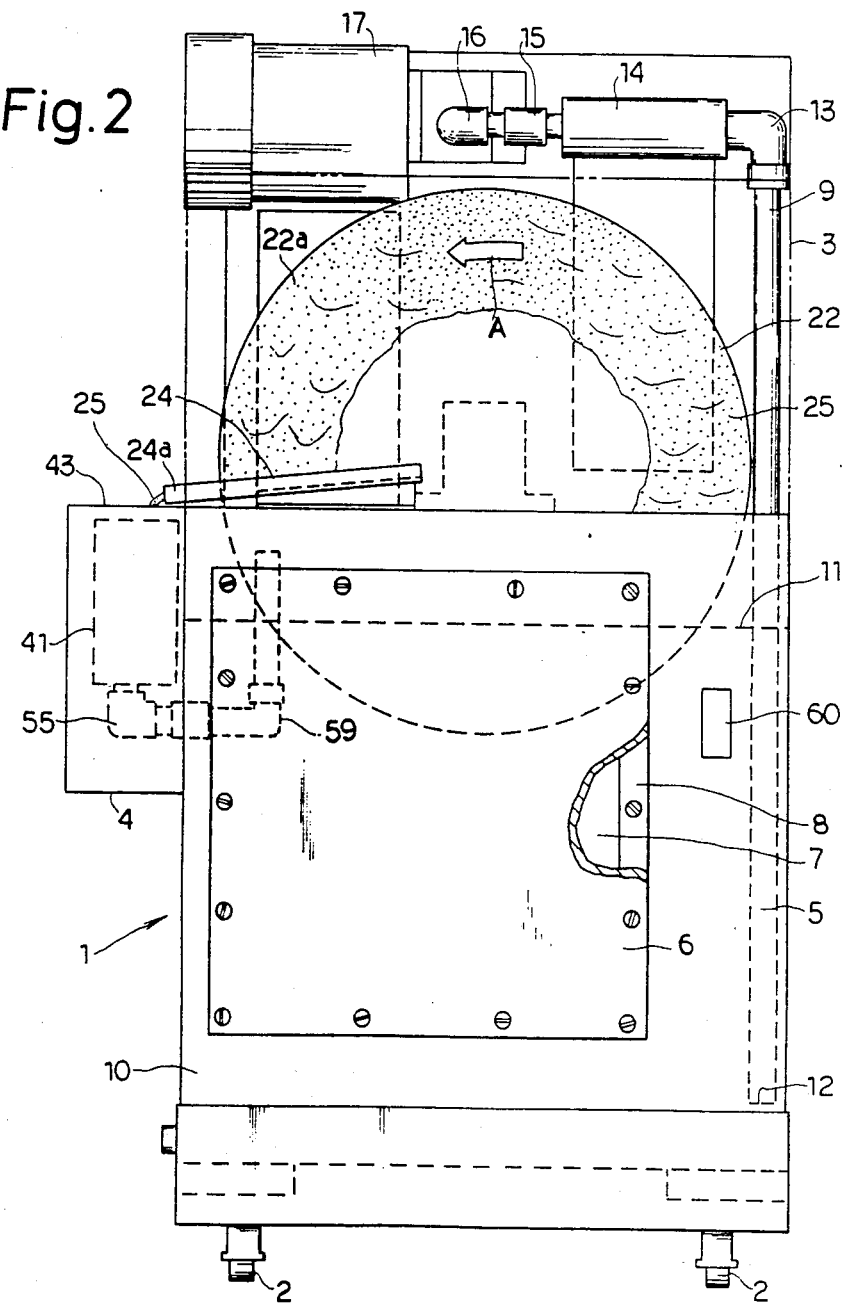
FIG. 2 is a side view, partly broken, showing the separating apparatus shown in FIG. 1.

FIGS. 1 and 2 show a separating apparatus 1 according to preferred embodiment of this invention. The separating apparatus 1 is placed near or under a machine tool such as a milling machine. The combined cutting liquids 11 contain both the water-soluble cutting liquid and the oily cutting liquid. The water-soluble cutting liquid is positioned in a lower portion of the tank 10 so as to constitute a lower liquid layer. The oily cutting liquid is positioned in an upper portion of the tank and floats on the water-soluble cutting liquid so as to constitute an upper layer. Thus, the combined cutting liquids 11 constitute two liquid layers. After the water-soluble cutting liquid and the oily cutting liquid are separately used at the machine tool, they are combined in the tank 10.

The separating apparatus 1 is equipped with casters 2 at four corners thereof so that the separating apparatus 1 can be easily moved.

A taking-out means 20 is provided over the tank 10 in order to take out the oily cutting liquid from the combined cutting liquids 11 contained in the tank 10.

The taking-out means 20 includes a motor 21, a rotation member 22 and a pair of removing members 23, 24. The rotation member 22 is preferably made of an acrylic resin because the oily cutting liquid can be effectively attached or adhered to it. In case of an acrylic resin, good resistance to both the oily cutting liquid and the water-soluble cutting liquid can be obtained.

The rotation member 22 is preferably formed in a disk shape although this invention is not limited to only such a shape.

Figure 3:
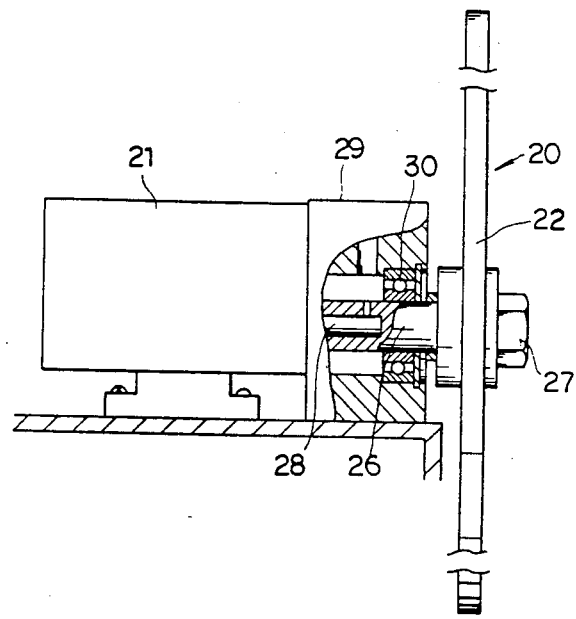
FIG. 3 is a front view showing, partly broken, a rotation means and a motor used in the separating apparatus of FIG. 1.

As shown in FIG. 3, the rotation member 22 is fixed to one end of a shaft 26 by means of a nut. The other end of the shaft 26 is joined to an output shaft 28 of a motor 21. The shaft 26 is supported through bearing means 30 by a bracket 29.

As shown in FIGS. 1 and 2, the rotation member 22 is immersed at its lower position in the oily cutting liquid layer of the combined cutting liquids 11. The rotation member 22 rotates in the direction of the arrow A as shown in FIG. 2.

Refering to FIGS. 1, 2 and 4 to 7, the pair of removing members 23, 24 are arranged in a symmetrical manner for removing the mixed cutting liquids 25 attached to the rotation member 22. The mixed cutting liquids 25 include the oily cutting liquid mixed with minor amounts of the water-soluble cutting liquid.

The rotation member 22 is placed between the pair of removing members 23 and 24. Only one removing member 24 will be explained in detail as a typical example.

Figure 4:
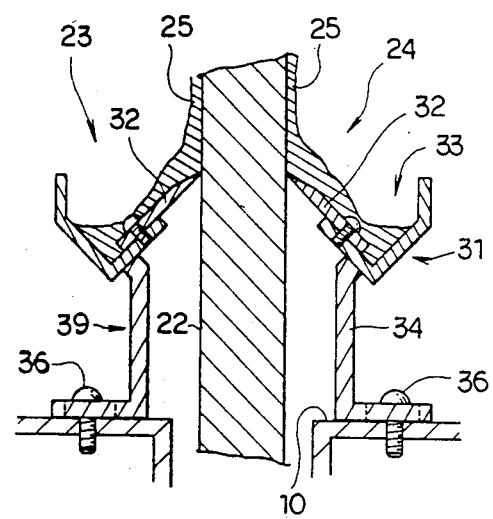
FIG. 4 is a sectional view showing a rotation means and a removing means used in the separating apparatus of FIG. 1.
Figure 5:
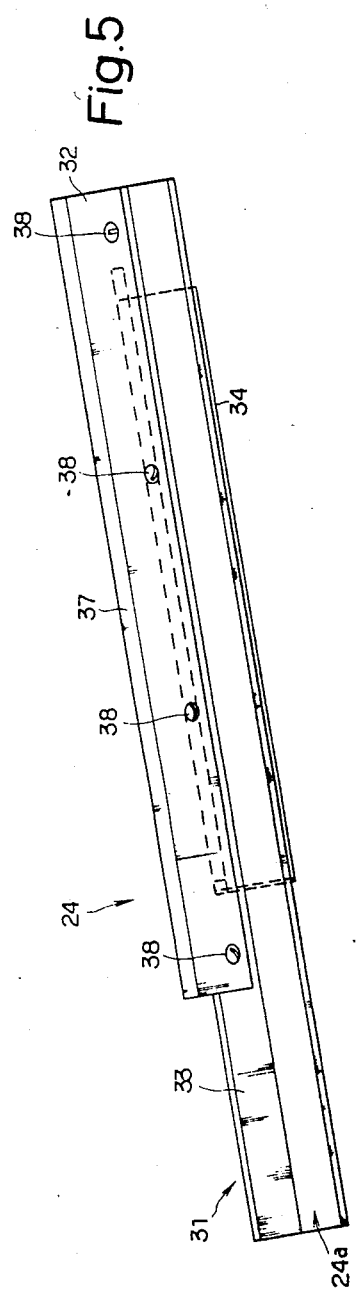
FIG. 5 is a plane view showing a removing means used in the separating apparatus of FIG. 1.
Figure 6:
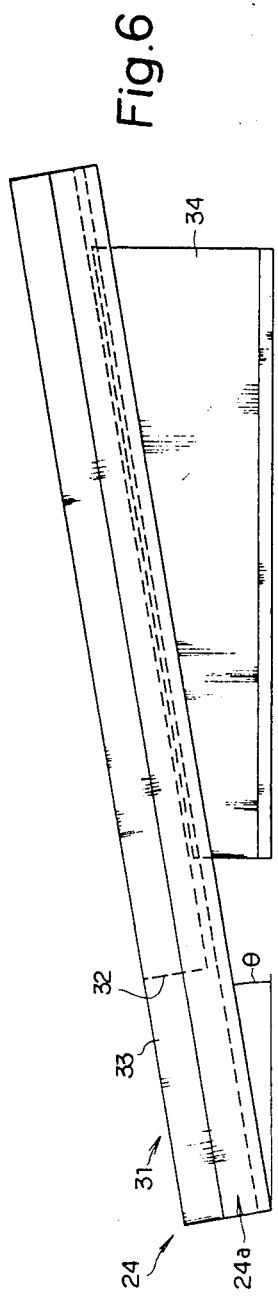
FIG. 6 is a front view showing a removing means used in the separating apparatus of FIG. 1.
Figure 7:
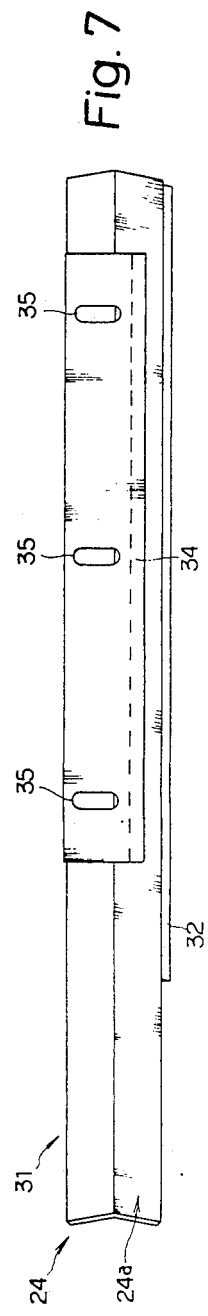
FIG. 7 is a plane view showing a removing means shown in the separating apparatus of FIG. 1.

As shown in FIGS. 4 to 7, the removing member 24 includes an oil trough 31 and a wiper 32 fixed to the oil trough 31. The oil trough 31 is preferably made of a stainless steel. The oil trough 31 has an oil guide portion 33 and a support portion 34. The oil guide portion 33 is inclined at an angle $\theta$ with respect to the support portion 34. A plurality of elongate openings 35 are formed in the support portion 34. As shown in FIG. 4, the support portion 34 is fixed to the tank 10 by means of a bolt 36.

The wiper 32 is detachably attached to the oil trough 31. The wiper 32 is made of a resilient material such as rubber and has a sharp edge 37, preferably in a knife shape. The wiper 32 has a good resistance against the water-soluble cutting liquid and the oily cutting liquid. The edge 37 contacts a side surface of the rotation member 22. The wiper 32 is fixed to the oil guide portion 33 by means of a bolt 38.

The removing member 23 is substantially the same as the removing member 24, for instance, including an oil trough 39 and a wiper 32.

Referring to FIGS. 1, 2, 8 and 9, the separator 40 is used to separate the oily cutting liquid from the water-soluble cutting liquid in the mixed cutting liquid 25 attached to the rotation member 22 and then return only the water-soluble cutting liquid to the tank 10. A pipe 41 is fixed through a fixing member 42 to a front wall 10a of the tank 10. A lower end portion of the pipe 41 is closed. An open portion 43 of the pipe 41 is located near a lower end portion 24a of the removing member 24 and a lower end portion 23a of the removing member 23 as best shown in FIGS. 1 and 2. The mixed cutting liquids 25 removed from the rotation member 22 are introduced through the removing members 23, 24 into the pipe 41.

Figure 8:
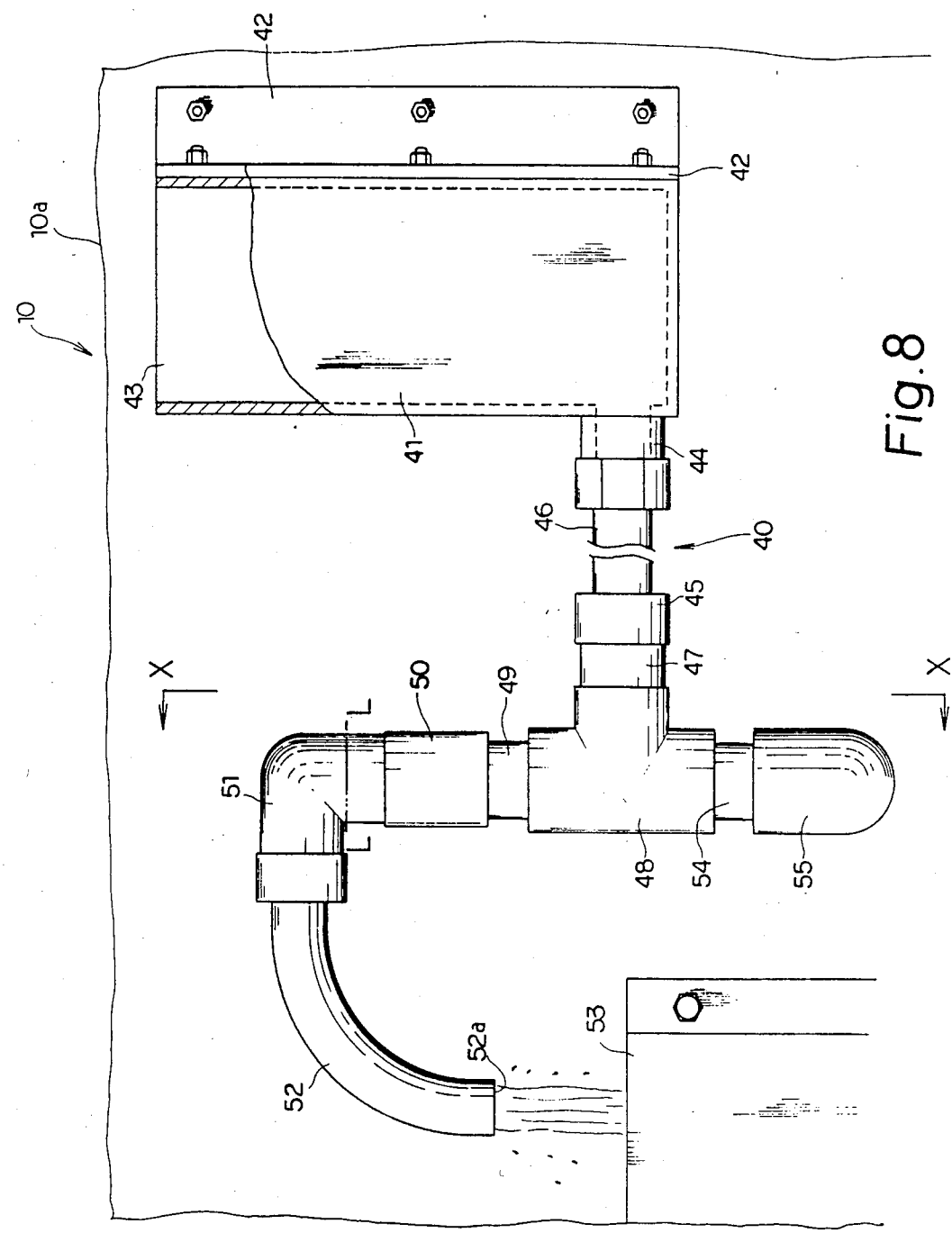
FIG. 8 is a front view showing a removing means and its related members used in the separating apparatus of FIG. 1.

As best shown in FIG. 8, a joint member 44 is attached to a lower end portion of the pipe 41. A pipe 46 is placed between the joint member 44 and a joint member 45. A nipple 47 is attached to the joint member 45. A separator member 48 is attached to the nipple 47. Another nipple 49 is attached to an open portion of the separator member 48. A joint member 51 is connected by way of a socket 50 to the nipple 49. A pipe 52 is connected to the joint member 51. An exit 52a of the pipe 52 is positioned over a tank 53 so that only the oily cutting liquid can be contained in it.

An upper open portion of the separator member 48 is connected to an elbow 55 through a nipple 54. The elbow 55 is connected to a pipe 59 by way of a nipple 56 and joint members 57, 58 as best shown in FIG. 9. The pipe 59 is vertically located and has an exit which is positioned over the liquid surface of the cutting liquids 11 in the tank 10. The exit 59a of the pipe 59 is positioned slightly below the line L—L of the joint member 51 as shown in FIGS. 8 and 9. The joint member 57 penetrates through the front wall 10a of the tank 10.

As shown in FIGS. 1 and 2, a cover 3 covers the rotation member 22 and the removing members 23, 24 so as to avoid entrance of dust. The cover 3 is dettachably provided. A cover 4 covers the separator 40 so as to avoid entrance of dust. The cover 4 is also detachable.

A cover 6 is attached through a packing material 8 to a side portion 5 of the tank 10. The cover 6 covers an opening 7. If the cover 6 is detached, the inside of the tank 10 can be easily cleaned.

As shown in FIG. 2, the pipe 9 is inserted into the tank 10. A lower end 12 of the pipe 9 is positioned at a bottom portion of the tank 10. An upper end of the pipe 9 is connected to one end of a strainer 14 through an elbow 13. The other end of the strainer 14 is connected to a cutting oil pump 17 through a joint member 15 and an elbow 16.

If a switch 18 (FIG. 1) is switched on so as to actuate the cutting oil pump 17, only the water-soluble cutting liquid in the tank 10 can be sucked through the pipe 9. The sucked water-soluble cutting liquid is sent to a machine tool (not shown) by way of the pipe 9, the elbow 13, the strainer 14, the joint member 15 and the elbow 16. At that time, the impurities contained in the water-soluble cutting liquid are removed by the strainer 14.

In operation, a predetermined volume of combined cutting liquids 11 are contained in the tank 10. A liquid surface of the combined cutting liquids 11 is always detected by a surface sensor 60 (FIG. 2) for the purpose of avoiding overflow.

First, the switch 19 (FIG. 1) is switched on so as to actuate the motor 21 so that the rotation member 22 begins to rotate in the direction of the arrow A in FIG.

2. The oily cutting liquid positioned in an upper portion of the tank 10 can be adhered or attached to both side surfaces 22a, 22b of the rotation member 22 and then moves upwardly in the direction of the arrow A together with the rotation member 22. The mixed cutting liquids 25 attached to the rotation member 22 are removed by the wipers 32 of the removing members 23, 24. The removed cutting liquids 25 flow along the oil trough 31 and the oil trough 39 into the pipe 41.

The cutting liquids 25 in the pipe 41 are further introduced into the separator member 48 as shown in FIGS. 8 and 9. The oily cutting liquid and the water-soluble cutting liquid are separated from each other within the separator member 48 due to the difference between their specific gravities.

Only the oily cutting liquid is introduced by way of the joint member 51 and the pipe 52 into the tank 53. The water-soluble cutting liquid is returned by way of the joint member 58 and the pipe 59 into the tank 10.

Accordingly, the oily cutting liquid in the cutting liquids 25 can be completely separated from the water-soluble cutting liquid. Only the water-soluble cutting liquid is returned into the tank 10.

If the rotation member 22 continuously rotates, only the oily cutting liquid contained in the tank 10 can be transferred into the tank 53. As shown in FIG. 1, the tank 53 can have a drain port 53a and a cap 53b attached to it. If the tank 53 is filled with the oily cutting liquid, the cap 53b is detached so that the oily cutting liquid can be drained into a container (not shown) for disposal purposes. It is preferable that an operator can know when the oily cutting liquid is contained in the tank 53 to a predetermined level, for example, by means of a buzzer.

This invention is not limited to the above-stated embodiment only. For example, the rotation member can be formed in a ball shape, a belt shape and any other shape. The separator 40 can be formed in any other type such as a centrifugal separator.

What is claimed is:

1. An apparatus for separting an oily cutting liquid from a water-soluble cutting liquid, comprising:
    a main tank (10) for containing combined liquids (11) including in combination the oily cutting liquid and the water-soluble cutting liquid which constitute two liquid layers;
    rotation means (22) always immersed at its lower position in the combined cutting liquids (11) for taking out upwardly the oily cutting liquid and some minor amount of water-soluble cutting liquid in a mixed condition from the combined cutting liquids (11) in such a way that the oily cutting liquid is attached onto the rotation means (22) when the rotation means (22) rotates in the combined cutting liquids (22);
    means (23, 24) for removing the oily cutting liquid from the rotation means (22);
    means (41) for receiving from the removing means (23, 24) the oily cutting liquid mixed with a minority of the watersoluble cutting liquid;
    an auxiliary tank (53) for containing only the oily cutting liquid; and
    means (48) having first, second and third passages for separating the oily cutting liquid and the water-soluble cutting liquid due to the specific gravity difference between them, the first passage being connected to the receiving means (41) for receiving the mixed liquids from the receiving means (41), the second passage being connected to the main tank (10) for supplying only the water-soluble liquid into the main tank (10), the third passage being connected to the auxiliary tank (53) for supplying only the oily cutting liquid into the auxiliary tank (53).

2. The apparatus of claim 1, wherein the removing means (23, 24) includes a wiper (32) having a sharp edge contacting the rotation means (22).

3. The apparatus of claim 1, wherein the removing means (23, 24) includes a pair of wipers (32) each having a sharp edge between which the rotation means (22) is placed in such a manner that each sharp edge of the wipers (32) contacts the rotation means (22).

4. The apparatus of claim 1, wherein the second passage of the separating means (48) extends downwardly at its entrance portion and upwardly at its exit portion and wherein the third passage of the separating means (48) extends upwardly at its entrance portion.

5. The apparatus of claim 4, wherein an exit (59a) of the second passage of the separating means (48) is positioned at a level (L) corresponding to an intermediate portion of the third passage of the separating means (48).

6. The apparatus of claim 1 further including a surface sensor (60) for detecting a liquid surface of the combined cutting liquids within the main tank (10) so as to avoid overflow thereof.

7. An apparatus for separating an oily cutting liquid from a water-soluble cutting liquid, comprising:
    a main tank (10) for containing combined liquids (11) including in combination the oily cutting liquid and the water-soluble cutting liquid which constitute two liquid layers;
    rotation means (22) always immersed at its lower position in the combined cutting liquids (11) for taking out upwardly the oily cutting liquid and some minor water-soluble cutting liquid in a mixed condition from the combined cutting liquids (11) in such a way that the oily cutting liquid is attached onto the rotation means (22) when the rotation means (22) rotates in the combined cutting liquids (22);
    means (23, 24) for removing the oily cutting liquid from the rotation means (22); and
    a surface sensor (60) for detecting a liquid surface of the combined cutting liquids (11) within the main tank (10) so as to avoid overflow thereof.

* * * * *